(12) United States Patent
Lindroth et al.

(10) Patent No.: US 10,584,693 B2
(45) Date of Patent: Mar. 10, 2020

(54) TWO PARTS TELESCOPIC CONNECTING ROD FOR ALTERNATIVE COMPRESSORS AND METHOD OF ASSEMBLING TWO-PARTS TELESCOPIC CONNECTING ROD IN ALTERNATIVE COMPRESSORS

(71) Applicant: Whirlpool S.A., Sao Paulo (BR)

(72) Inventors: João Victor Lindroth, Joinville (BR); Adilson Luiz Manke, Joinville (BR); Moises Alves de Oliveira, Joinville (BR); Osimar Aparecido de Oliveira, Joinville (BR); Gerson de Araújo, Joinville (BR)

(73) Assignee: Whirlpool S.A., Sao Paulo-SP (BR)

( * ) Notice: Subject to any disclaimer, the term of this patent is extended or adjusted under 35 U.S.C. 154(b) by 284 days.

(21) Appl. No.: 15/392,442

(22) Filed: Dec. 28, 2016

(65) Prior Publication Data

US 2017/0184084 A1 Jun. 29, 2017

(30) Foreign Application Priority Data

Dec. 29, 2015 (BR) ...................... 10 2015 032840 0

(51) Int. Cl.
  *F16C 7/06* (2006.01)
  *F04B 39/00* (2006.01)
  *F04B 39/14* (2006.01)

(52) U.S. Cl.
  CPC .......... *F04B 39/0022* (2013.01); *F04B 39/14* (2013.01); *F16C 7/06* (2013.01)

(58) Field of Classification Search
  CPC .. F16C 7/02; F16C 7/023; F16C 7/026; F16C 7/04; F16C 7/06; F16C 7/08; F16C 9/04;
  (Continued)

(56) References Cited

U.S. PATENT DOCUMENTS

| 1,823,158 A | * | 9/1931 | Spatta | ...................... B21K 1/12 |
| | | | | 29/517 |
| 4,930,405 A | | 6/1990 | Lilie | .............................. 92/128 |

(Continued)

FOREIGN PATENT DOCUMENTS

| DE | 102012201292 A1 | * | 8/2013 | ................ B60S 1/24 |
| JP | 55 84880 | | 8/2014 | |
| KR | 10-20080017214 A | | 2/2008 | |

OTHER PUBLICATIONS

Machine Translation of DE 102012201292, obtained Mar. 12, 2019.*

*Primary Examiner* — Richard W Ridley
*Assistant Examiner* — Brian J McGovern
(74) *Attorney, Agent, or Firm* — Harrington & Smith (57) ABSTRACT

The connecting rod includes a first portion of the connecting rod to be mounted on the eccentric pin of a crankshaft of the compressor and a second portion of the connecting rod to be articulated in a reciprocating piston within a cylinder. One of the first and second portions of the connecting rod includes a tubular stem portion that receives, telescopically and loosely, and retains, by radial inward deformation, a portion of the engagement stem of the other portion of the connecting rod, said stem portions being held together, in an axial and rotational alignment condition, before being attached by a fixation mean in a relative axial positioning, which results in a portion of the compression chamber and a respective portion of dead volume in the condition of upper dead point of the piston.

5 Claims, 7 Drawing Sheets (58) Field of Classification Search
CPC ...... F16C 9/06; F16C 9/02; F16C 3/14; F16C 3/06; F16J 1/16; F64C 27/54; F64C 27/605; F64C 27/59; F04B 39/0022; F04B 39/14; F01M 2001/062; F01M 1/06
See application file for complete search history.

(56) References Cited

U.S. PATENT DOCUMENTS

| | | | |
|---|---|---|---|
| 5,104,136 A * | 4/1992 | Buhl | B60G 7/001 188/371 |
| 6,551,067 B1 | 4/2003 | Vollrath et al. | 417/53 |
| 2003/0086756 A1 * | 5/2003 | Trotter | B25B 23/0035 403/293 |
| 2006/0013715 A1 * | 1/2006 | Andersen, Jr. | F04B 39/0022 417/437 |
| 2011/0297996 A1 | 12/2011 | Van den Brand et al. | 257/99 |

* cited by examiner

TWO PARTS TELESCOPIC CONNECTING ROD FOR ALTERNATIVE COMPRESSORS AND METHOD OF ASSEMBLING TWO-PARTS TELESCOPIC CONNECTING ROD IN ALTERNATIVE COMPRESSORS

FIELD OF THE INVENTION

The present invention refers to a two-parts telescopic connecting rod and a method of assembling of the two-parts telescopic connecting rod for domestic and commercial application in alternative compressors of the type used in refrigeration machines of small size, such as refrigerators, freezers, water coolers, displays, refrigerated counters, etc.

BACKGROUND OF THE INVENTION

Alternative compressors used in refrigeration systems have a connecting rod mounted, at one side, to an eccentric pin of a crankshaft which is journaled in a bearing block and, on the other side, to an alternative piston within a cylinder, which is orthogonal to the geometrical axis of the eccentric pin, between a lower dead point condition and an upper dead point condition, respectively, defined by a maximum and a minimum linear spacing between a front-end face of the piston and a valve plate, seated and fixed against a front-end of the cylinder and defining the inner face of a head assembly which forms suction and discharge chambers of the compressor.

In these constructions, at the upper dead point condition, the piston should be within a certain distance from a confronting face of the valves plate, defining, in this region, a portion of the compression chamber and, consequently, a portion of the minimum dead volume, previously determined to avoid that, during normal operation of the compressor, any impacts of the piston against the valve plate occur.

As to avoid compromising the compressor performance, the portion of the compression chamber in which is defined a corresponding portion of the dead volume, originated in the adjacent region to the valve plate of the head, it must have a small value as possible to avoid the loss of efficiency of the compressor.

Due to the reduced size of the components and the small space for mounting the piston-connecting rod-eccentric pin assembly, different alternatives have been proposed for constructing a connecting rod, aiming to facilitate mounting of this assembly in the compressor. Among the many alternatives, it can be cited those using connecting rod with two-parts, as occurs in solutions U.S. Pat. Nos. 4,930,405 and 6,551,067, of the same Applicant. Also, solutions of two-parts connecting rod as described in documents KR2008-0017214 and JP5584880 are known. The construction of the two-parts connecting rod has the advantage of facilitating the mounting of the connecting rod assembly to the parts of the eccentric pin and the piston in the compressor.

Although facilitating the mounting in the compressor, the two-parts connecting rod require that its final mounting is made to provide:

the correct axial alignment (or longitudinal parallelism) between the geometrical axis of the larger and the smaller eye (or perpendicularism between the major geometrical axis of the larger eye and the two-parts connecting rod in the case of a spherical joint);

the correct cross-parallelism (rotational alignment) between the axis of the larger and the smaller eye, and further;

the correct total connecting rod length (or relative axial positioning between the geometrical axis of the larger and the smaller eye, wherein the axial direction is relative to the connecting stem between the two eyes) to produce a corresponding portion of dead volume as small as possible for each compressor to be mounted. For avoiding the specification of extremely low tolerances and expensive in each compressor being mounted, it is commonly used the artifice of providing different groups of sealing gasket to be positioned between the front-end face of the cylinder and the confronting face of the valves plate, for providing the final adjustment of the dead volume. However, the use of different types and groups of the gasket to achieve the correct dimensioning of the compression chamber and, consequently, the respective portion of dead volume in each compressor unit being manufactured, is highly undesirable, since it requires cumbersome operations of measuring the protrusion of the piston, the provision of different groups of gasket and further, the selection of said elements for mounting each compressor unit.

Some of the solutions of the prior art which use the two-parts connecting rod do not produce a final attachment between the two stem portions, capable of allowing a continuous variation of the total final connecting rod length, specifically and properly sized to provide the same pattern of portion of dead volume in the compression chamber, regardless of the use or not of a single group of sealing gasket between the front-end face of the cylinder and the valve plate. This occurs with the solutions of the type described in documents U.S. Pat. No. 4,930,405, KR2008-0017214 and JP55-84880.

In another prior art solution, which allows a continuous adjustment by telescopic engagement, the two portions of the connecting rod, as described in document U.S. Pat. No. 6,551,067B1, results from the fact that the telescopic engagement is made with an interference in necessary degree and sufficient to hold the two stem portions in a telescopic positioning determined by the axial compression of the two parts, generally obtained by seating of the front-end face of the piston against a mounting shim, having predetermined sizing and which is held seated against the front-end face of the cylinder, when the crankshaft is rotated until it reaches the upper dead point of the piston.

A major problem which has limited and even prevented the effective use of this solution with two-parts telescopic connecting rod, as described in document U.S. Pat. No. 6,551,067B1, results from the difficulty and even the impracticality to produce, in the construction of the two portions of the stem, a dimensional accuracy that leads to a degree of mechanical interference in the telescopic engagement, sufficient to ensure a proper axial force range, defined:

(a) By a minimum axial force of insertion, in order to keep the two portions of the stem in the correct telescopic positioning, defined at the upper dead point of the piston, until the final fixation is produced between the two portions;

(b) By a maximum axial force of insertion which is insufficient for the compressive forces, for adjustment of the telescopic engagement provided between the eccentric pin of the crankshaft and the mounting shim, do not produce deformations in the assembly of block-cylinder-connecting rod-axis capable of impairing the proper sizing of the dead volume to be obtained in each compressor, using a single group or minimized variation for the sealing gasket to be provided between the valve plate and the front-end face of the cylinder.

Due to the difficulties in obtaining, in an economically feasible manner, the suitable degree of mechanical interference between the two stem portions, to be telescopically engaged together, it is common to provide a degree of insufficient interference to ensure the maintenance of the telescopic positioning defined at the upper dead point of the piston, when the crankshaft is rotated to bring the piston-connecting rod assembly to the lower dead point, facilitating the final fixation of the two portions by different solutions, such as by welding, brazing, adhesive, and the like. On the other hand, when the degree of interference is excessive, the compressive force between the two portions of the connecting rod, for the adjustment of the telescopic positioning, produces elastic deformations in the involved parts, capable of producing deviations of sizing of the desired dead volume, in sufficient degree to require the resizing/replacement of the sealing gasket, for obtaining a compression chamber portion that defines the desired respective portion of dead volume.

Due to the difficulties of obtaining a suitable degree of mechanical interference in the telescopic engagement and the dimensional variations present in the components of the compressor and which can modify the relative position between the parts of the eccentric pin and the piston, generally, the mounting of the connecting rod to the latter determines a length that differs from that optimal desired and which requires final settings by using different groups of sealing gasket between the valve plate and the front-end face of the cylinder.

SUMMARY OF THE INVENTION

Due to the difficulties presently encountered to enable the use of two-parts connecting rods with telescopic engagement, the present invention has as an object to provide a connecting rod of the type herein contemplated and having, in addition to the advantages of assemblage in the compressor, inherent to its own two-parts and telescopic attributes, a preliminary retention between the two stem portions in a condition of axial and rotational alignment between them, in the condition of the connecting rod being mounted in the compressor, before the final and definitive mutual attachment of said stem portions, in a relative axial positioning corresponding to a desired portion of the compression chamber with the consequent portion of minimal dead volume at upper dead point of the piston, for a given thickness of sealing gasket between the front-end face of the cylinder and the valve plate.

The invention further has the objective of providing a method of mounting a connecting rod, having two-parts and telescopic engagement in an alternative compressor, which enables a preliminary retention between the two portions in a condition of axial and rotational alignment between them and with a degree of mutual interference which allows the achievement of an easy and precise adjustment of the relative axial positioning between said stem portions, already in the condition of the connecting rod mounted in the compressor, before the final and definitive mutual attachment of said stem portions, allowing a more precise control of compression chamber portion, that defines a respective portion of dead volume in the cylinder.

The connecting rod in question is of the type that comprises a first portion of the connecting rod to be mounted on the eccentric pin of a compressor crankshaft and a second portion of the connecting rod to be articulated in a reciprocating piston within a cylinder having an open front-end face, which is closed by a valve plate.

In accordance with a first aspect of the invention, one of the portions of the connecting rod comprises a tubular stem portion, while the other portion of the connecting rod comprises an engagement stem portion which is telescopic and loosely fitted into the interior of the tubular stem portion.

The tubular stem portion incorporates at least two circumferential alignments of inward facing radial deformations and seated, with predetermined mechanical interference, against the engagement stem portion, retaining the latter to the tubular stem portion, in a predetermined condition of axial and rotational alignment between them.

The tubular and engagement stem portions have portions of its surface, fixed one to another, in a definitive manner by an adhesion fixation mean, in a relative axial positioning, in a condition in which the top face of the piston maintains a predetermined distance relative to the confronting face of the valves plate, to provide a desired compression chamber portion, that forms a respective portion of dead volume, the lowest possible, in the condition of upper dead point of the piston.

The method of assembly of the connecting rod in question comprises, a basic initial step of providing one of the first and second portions of the connecting rod with a tubular stem portion and provide the another portion of the connecting rod with an engagement stem portion presenting cross-section with the outer contour smaller than the inner contour of the cross-section of the tubular stem portion.

In certain embodiments, the method comprises the step of mounting the piston to one of said portions of the connecting rod, and then, the step of providing the loose and telescopic engaging, of the engagement stem portion in the interior of the tubular stem portion, with the assembly of said portions of the connecting rod and piston maintained of the compressor, in a mounting device, or with the first portion of the connecting rod already mounted to the eccentric pin and with the second portion of the connecting rod and the piston mounted in the cylinder of the compressor.

Then, it is performed the step of engaging, telescopic and loosely, the engagement stem portion in the interior of the tubular stem portion, by maintaining the eccentric pin in the lower dead point condition and conducting the portions of tubular and engagement stem to a predetermined condition of axial and rotational alignment between them both and relative axial and preliminary positioning, defining a connecting rod length greater than that required to provide a desired compression chamber portion and a respective portion of minimal dead volume at the upper dead point condition of the eccentric pin and of the piston.

Having the two portions of the connecting rod already aligned and axially positioned together, in the assembled condition, in the compressor or outside of it, and in a mounting device, the tubular stem portion is subjected to a shaping operation, as to form circumferential alignments therein, inwardly facing radial and seated deformations, with predetermined mechanical interference against the engagement stem portion, retaining the latter to tubular stem portion, in said axial and rotational alignment conditions and relative axial and preliminary positioning between them.

If the telescopic engagement operations, alignment and relative axial positioning and shaping have been performed outside of the compressor, in any suitable mounting device, the connecting rod can be disassembled or maintained in assembled condition and already shaped, to be then assembled in the compressor, with the first portion of the connecting rod being adapted to the eccentric pin and with the second portion of the connecting rod, generally already coupled to the piston, being mounted in the cylinder of the compressor. In the event of the piston has not been previously mounted to the second portion of the connecting rod, it is then inserted into the cylinder and coupled to the second portion of the connecting rod.

Having the connecting rod and the piston already assembled in the compressor, the crankshaft of the compressor is rotated causing the eccentric pin to pass through the upper dead point condition, seating the piston against a stop provided near to the front-end face of the cylinder and compressing, axially and telescopically, the portions of the tubular and engagement stem until the eccentric pin reaches the upper dead point position, by providing an adjustment of the relative axial positioning of the tubular and engagement stem portions, to a condition in which the top face of the piston starts to define, with the confronting face of the valves plate, the desired portion of the compression chamber and the respective portion of dead volume in the condition of upper dead point of the eccentric pin.

The crankshaft can then be rotated to return the eccentric pin to the lower dead point condition.

Then, it is performed the operation of fixing, mutually and in definitive mode, by a fixing means, defined among welding, adhesion and brazing, surface portions of the tubular and engagement stem portions.

The constructive solution proposed by the present invention enables, in a relatively simple and accurate manner, that the preliminary telescopic engagement between the tubular and engagement stem portions having a predetermined degree of mechanical interference, generating an narrow range of resistance force to the axial displacement between the portions of the connecting rod, that allows axially retaining said portions against the compression forces, when said parts are telescopically compressed together while adjusting the axial dimension of the connecting rod, during the displacement of the eccentric pin of the crankshaft, to the upper dead point position of the piston and still withstand to the tensile forces when the displacement of the connecting rod to the condition of the lower dead point of the eccentric pin, in which has its portions definitely fixed to each other.

In the event of the cylinder being defined by a liner mounted in a hole in the compressor block, the shaping operation is generally performed outside of the compressor, in a mounting device, with the assembly defined by the two portions of the connecting rod, already preliminarily held together by the conformation of the tubular stem portion against the engagement stem portion and carrying the larger eye and the piston, thus mounted in the compressor, with the first portion of the connecting rod being adapted to the eccentric pin and with the second portion of the connecting rod, normally already coupled to the piston, being mounted within the hole of the block. Thereafter, the liner is inserted into the hole of the block and pulled over the piston.

BRIEF DESCRIPTION OF THE DRAWINGS

The invention will now be described regarding the enclosed drawings, in which.

DESCRIPTION OF THE ILLUSTRATED EMBODIMENT

The present invention is described for a two-parts telescopic connecting rod, of the type that operates in an alternative compressor used in refrigeration systems.

Figure 1:
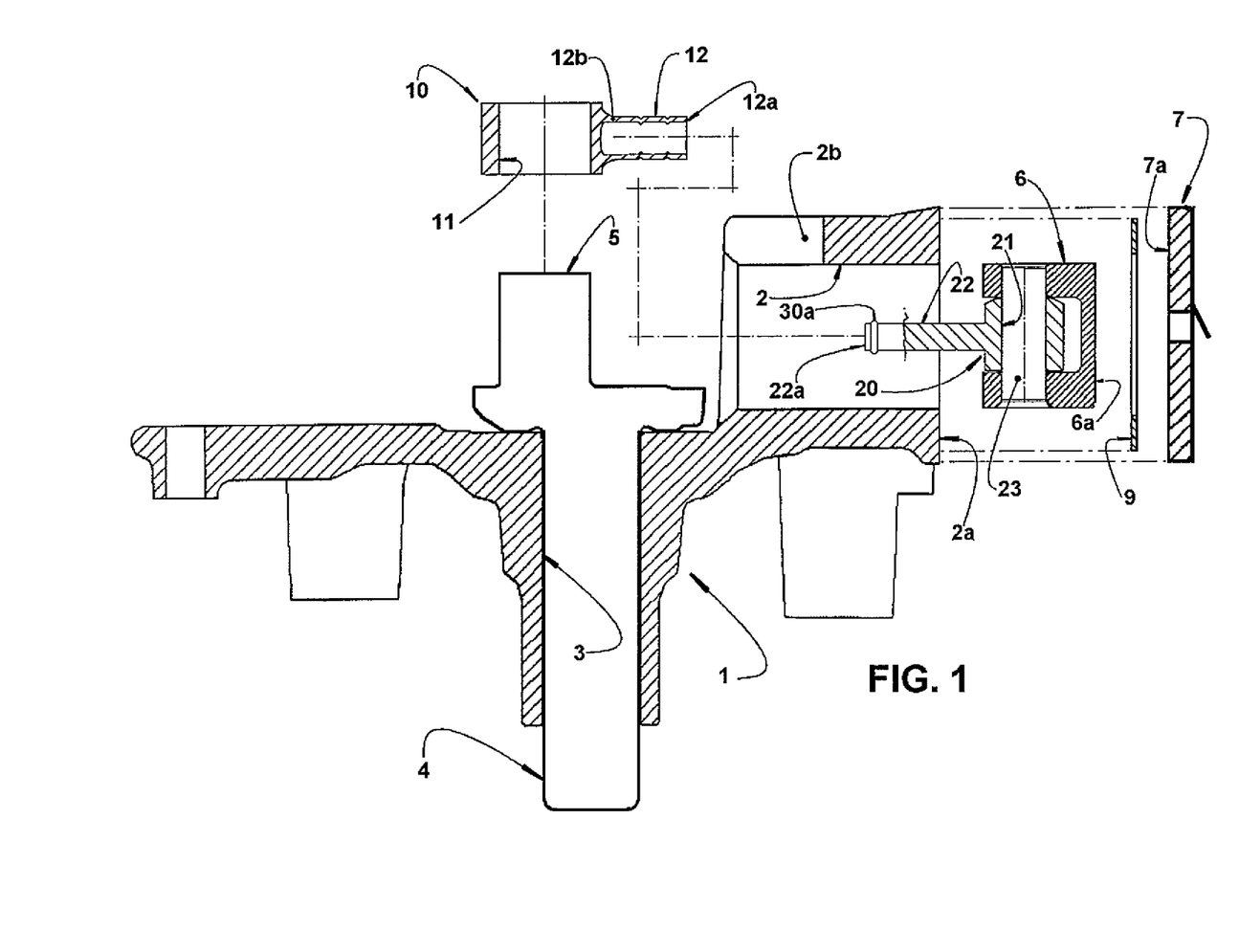
FIG. 1 represents, schematically and in longitudinal section, part of the bearing block carrying a crankshaft and incorporating a cylinder, still being illustrated in exploded condition, a piston coupled to one of the portions of the connecting rod, the other portion of the connecting rod to be coupled to the eccentric pin of the crankshaft in the lower dead point condition and a valves plate for closing the front-end face of the cylinder.
Figure 1A:
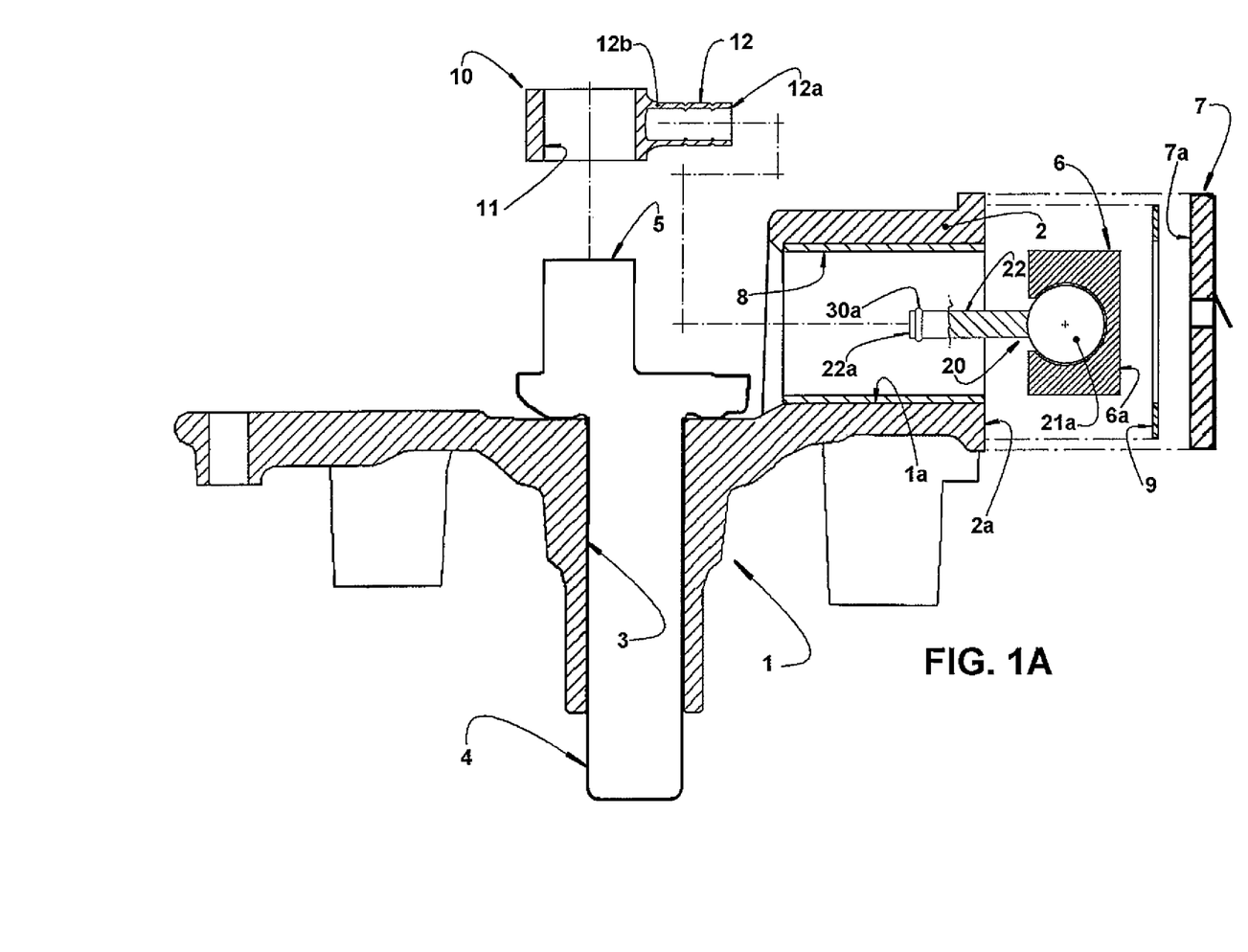
FIG. 1A is a similar view to that of FIG. 1, but illustrating a compressor construction in which the cylinder is formed by a liner in a separate piece of the bearing block and the piston attached to one of the portions of the connecting rod by a spherical joint.
Figure 2:
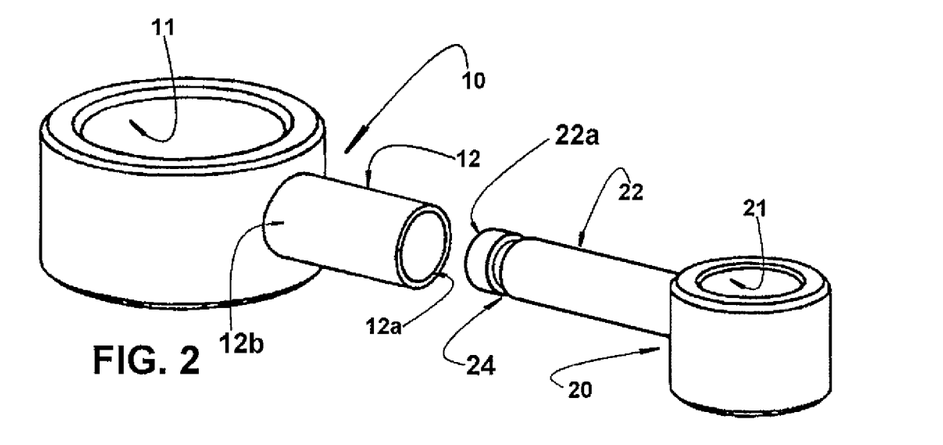
FIG. 2 represents, schematically, and in exploded and enlarged perspective view, the connecting rod of the invention.
Figure 3:
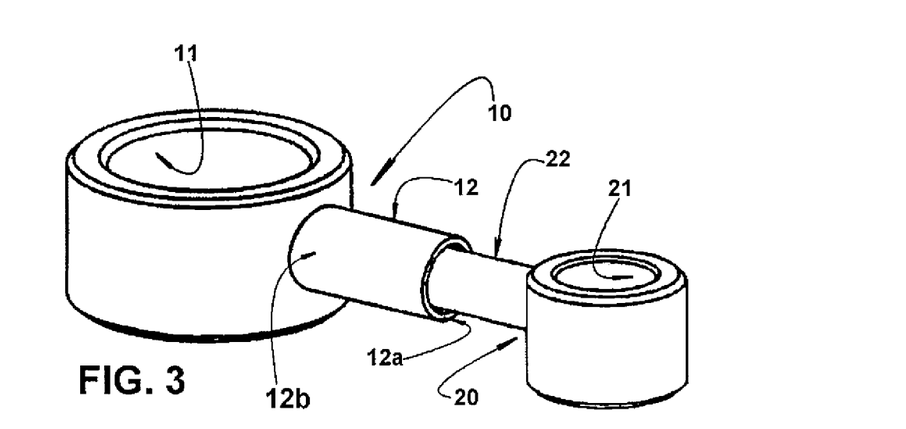
FIG. 3 represents, schematically and enlarged perspective view, the connecting rod of FIG. 2 with its connecting rod portions telescopically engaged within each other.

According to FIGS. 1 and 1A, the alternative compressor is of the type that comprises, in the interior of a not illustrated housing, a bearing block 1 incorporating a cylinder 2 having an open front-end face 2a and a bearing hub 3 carrying a crankshaft 4 provided with an eccentric pin 5. The cylinder 2, when formed directly in the block 1, can present, laterally and superiorly, a longitudinal slot 2b, wherein the function of which will be defined later.

The connecting rod in question comprises a first portion of the connecting rod 10 to be mounted on the eccentric pin 5 of the crankshaft 4 and a second portion of the connecting rod 20 to be articulated in a piston 6 having a top face 6a and to be displaced, in alternative movement within the cylinder 2. The opened front-end face 2a of the cylinder 2 is closed by a confronting face section 7a of a valves plate 7, of any suitable construction.

In the construction illustrated in FIGS. 1 and 1A, the second portion of the connecting rod 20 is articulated by a smaller eye 21 and by an articulating pin 23, to the piston 6. However, it should be understood that the second portion of the connecting rod 20 can be articulated to the piston 6 by an articulated or a spherical joint 21a. In both constructions illustrated in FIGS. 1 and 1A, the first portion of the connecting rod 10 is articulated to the eccentric pin 5 of the crankshaft 4, by a larger eye 11.

In the compressor of FIG. 1, the cylinder 2 is defined in the bearing block 1 itself, while in FIG. 1A, the block 1 is provided with a hole 1a in which a liner 8 is adapted, defining the cylinder 2, and into which the piston 6 is moved in alternative movement. It should be noted that the liner 8 can be used with other configurations for mounting the smaller eye 21 to the piston 6, different from which uses the spherical joint 21a. In the same way, the spherical joint 21a can be used in other constructions of the cylinder lacking the liner 8, such as the one illustrated in FIG. 1.

As it is known about the alternative compressors, the piston 6 is subjected to an alternative movement within the cylinder 2 (or of the liner 8) in orthogonal course to the geometrical axis of the eccentric pin 5, between a lower dead point condition of the eccentric pin 5 (FIGS. 1 and 1A) and an upper dead point condition (FIG. 4), respectively defined by a maximum and a minimum linear spacing between the top face 6a of the piston 6 and the confronting face 7a of the valves plate 7, which is normally seated in the front-end face 2a of the cylinder 2 with the interposition of at least one joint 9, which can be replaced by an adhesive.

According to the invention, one of the first and second portions of the connecting rod 10, 20 comprises a tubular stem portion 12, while the other portion of the connecting rod 20, 10 comprises an engagement stem portion 22 that is telescopically and loosely engaged in the interior of the tubular stem portion 12.

In the illustrated embodiment, the tubular stem portion 12 radially protrudes, preferably in a single piece, outside of the larger eye 11 of the first portion of the connecting rod 10, while the engagement stem portion 22 projects radially, preferably in a single piece, outside of the smaller eye 21 of the second portion of the connecting rod 20. However, it should be understood that the tubular stem portion 12 can be incorporated into the smaller eye 21 of the second portion of the connecting rod 20 or even to the spherical articulation of the latter, when the smaller eye 21 is replaced by a spherical joint 21a (shown in FIG. 1A). In this case, the engagement stem portion 22 is incorporated into the larger eye 11 of the first portion of the connecting rod 10.

In accordance with the invention, the tubular stem portion 12 incorporates at least two circumferential alignments of radial deformations 13 (see FIGS. 5 and 7) inwardly faced and configured to be seated with a predetermined mechanical interference, against the engagement stem portion 22, holding the latter to the tubular stem portion 12, in a predetermined condition of axial and rotational alignment between them, with a resistive force which is proportional to said mechanical interference.

The radial deformations 13 of the tubular stem portion 12 are preferably obtained by means of a mechanical shaping operation as, for example, by crimping, carried out in a suitable equipment capable of holding the two portions of the connecting rod 10, 20, in a certain relative telescopic positioning, while the tubular stem portion 12 is shaped to be retained to the engagement stem portion 22 by means of the radial deformations 13, as further discussed below, relative to the connecting rod assembly methodology in question.

The outer contour of the cross-section of the engagement stem portion 22 and the inner contour of the cross-section of the tubular stem portion 12 are preferably circular to facilitate the provision of radial deformations 13 on each circumferential alignment, since the circular cross-sections of the two stem portions allow that they define together a continuous annular space, defined along the longitudinal length of the overlap of the tubular stem portion 12 relative to the engagement stem portion 22 and which is independent of relative rotational positioning (indexing) between the two stem portions for the formation of the connecting rod.

The preference for a geometry of circular cross-sections of the two stem portions is also due to the greater easiness and lower processing cost to achieve this geometry, as by drawing operations, extrusion, turning, drilling and finishing operations such as enlargement, honing and grinding, among others.

The radial deformations 13 of the tubular stem portion 12 are arranged angularly spaced from each other in each respective circumferential alignment transverse to the longitudinal geometrical axis of the connecting rod.

In the illustrated embodiment, each circumferential alignment has three radial deformations 13, disposed in respective regions equally spaced from each other, wherein these radial deformations, generated preferably by a forming tool acting on the outer surface of the tubular stem portion 12, radially extend from the inner surface of the tubular stem portion 12, due to the low wall thickness of the tubular stem portion 12. However, the radial deformations 13 can have different configurations, for example, in the form of predefined axial length or circumferential ribs or even circumferentially continuous, protruding to the inner circular contour of the tubular stem portion 12. Said radial deformations 13 (or ribs) can be extended in cross-sectional or longitudinal directions to the tubular stem portion 12.

The construction herein proposed allows, after shaping the tubular stem portion 12 and the correct dimensional adjustment of the connecting rod, the tubular 12 and engagement 22 stem portions can have surface portions adhered to each other, in definitive manner and by a fixation mean 30, in a relative axial positioning, in a condition in which the top face 6a of the piston 6 maintains a predetermined distance from the confronting face 7a of the valves 7, to provide a desired compression chamber portion which forms a respective portion of dead volume in the condition of upper dead point of the eccentric pin 5 and the piston 4.

The fixation mean 30 can be defined, for example, from weld, adhesive and brazing and can fill the annular space defined between the portions of the tubular 12 and engaging stem 22 along at least a portion of the longitudinal length of the overlap of the tubular stem portion 12 relative to the engaging stem 22.

Alternatively, the same radial deformations 13 can be used for the definitive fixation, without the use of additional material such as, for example, by capacitive or laser welding.

Figure 4:
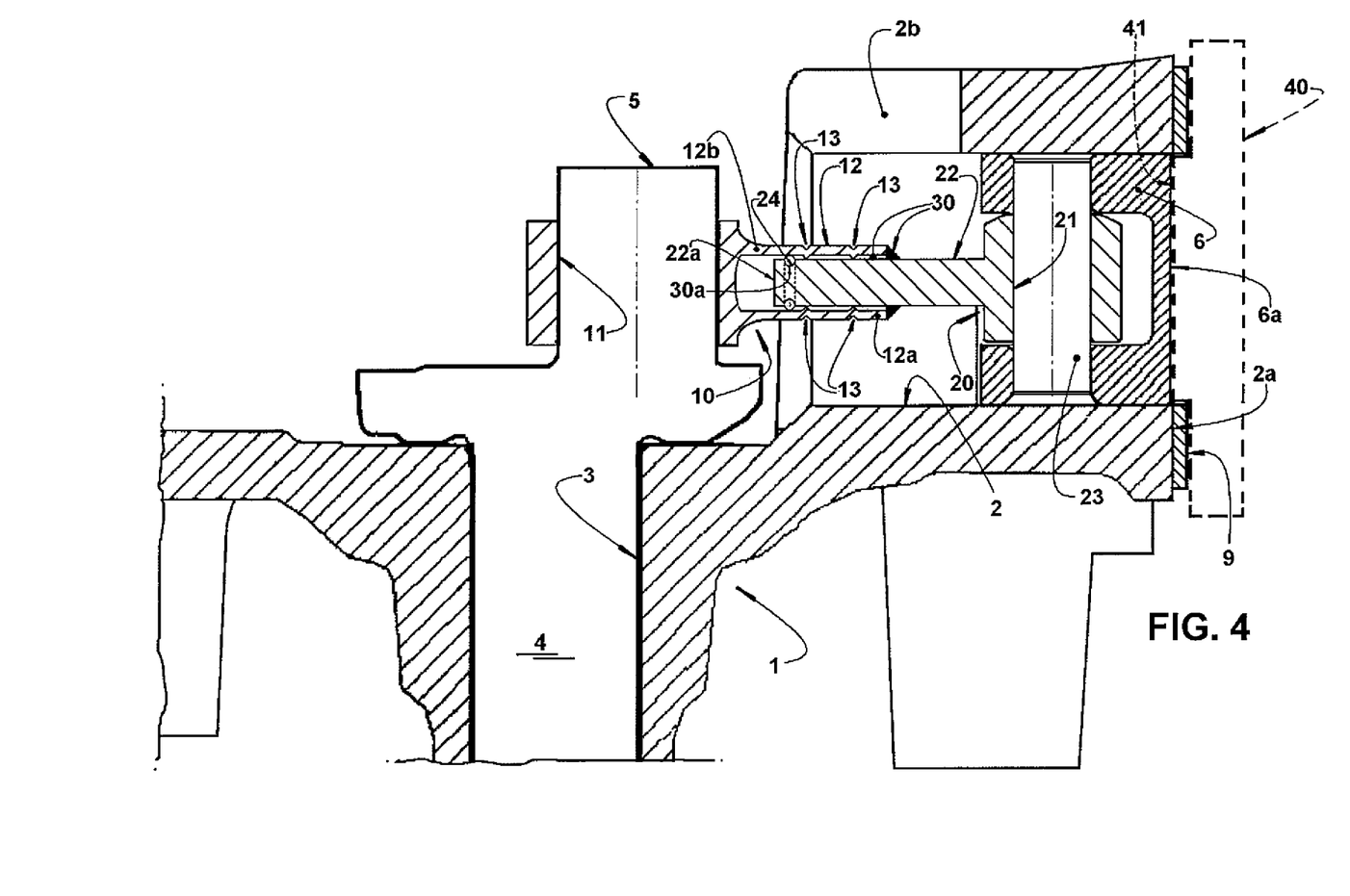
FIG. 4 represents, schematically and in longitudinal section, the assembly illustrated in FIG. 1, with the connecting rod mounted in the compressor with the eccentric pin of the crankshaft in upper dead point condition and with the top face of the piston seated against a stop positioner that, in the illustrated example, is seated and retained in the front-end face of the cylinder.
Figure 5:
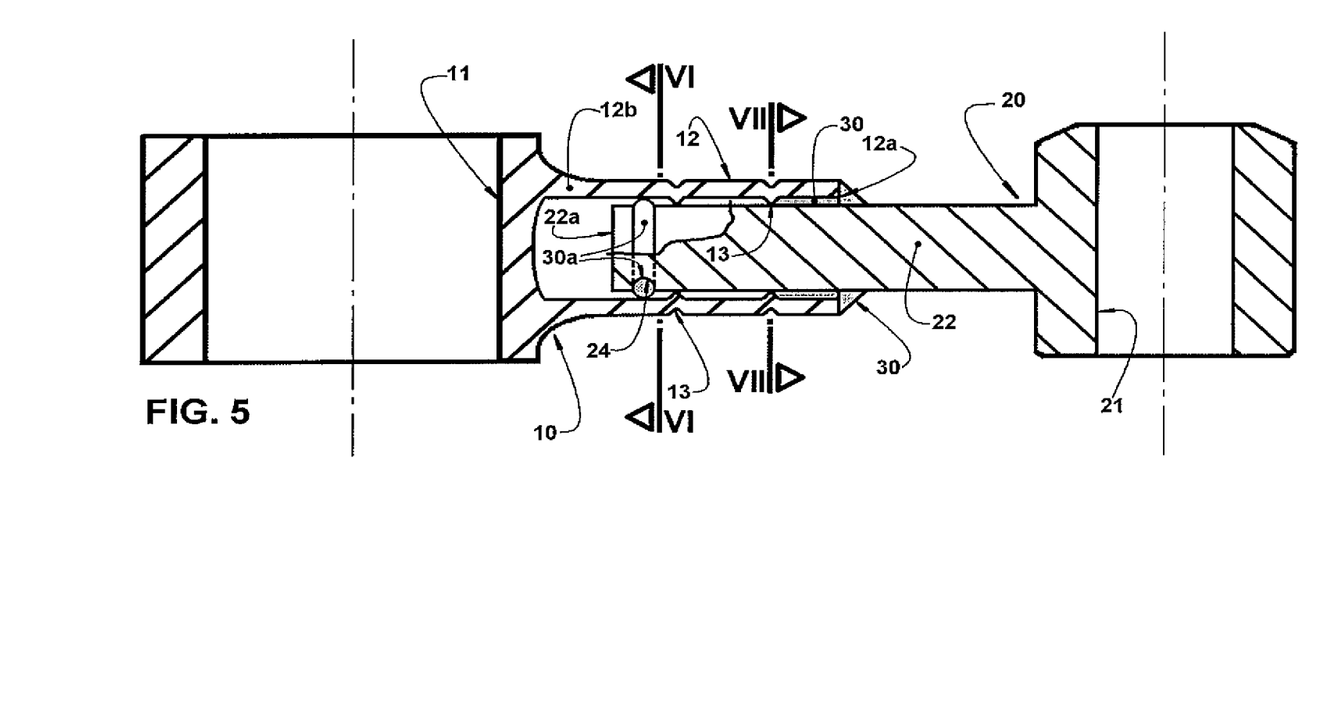
FIG. 5 represents a longitudinal sectional view, on an enlarged scale, of the connecting rod in the finished condition, but detached from the compressor, for better visualization of the clamping arrangement between the two portions of the connecting rod.

As illustrated in FIGS. 4 and 5, the fixation mean 30 can also comprise a cord or weld spots provided between said stem portions, in at least one of the regions of the bottom of the tubular stem portion 12 and at one end of the length of the overlap between them, adhering in definitive manner, the portion of the outer telescopic stem, i.e., the tubular stem portion 12, the peripheral circumferential adjacent region of the inner portion of the telescopic stem, defined by the portion of the engagement stem 22.

However, as illustrated in FIG. 5, the definitive fixation between the tubular stem portion 12 and the engagement stem portion 22 can further include the provision of other fixation mean 30a, in the form of a welded ring of addition, opened or closed, having in one of the regions defined by the free-end portion 22a of the engagement stem portion 22 and at the bottom of the tubular stem portion 12, welding said parts together when molten.

The welded ring of addition, when applied to the free end portion 22a of the engagement stem portion 22, can be loosely engaged, for example, in a circumferential recess 24 provided around the engagement stem portion 22 and with clearance relative to the tubular stem portion 12.

Thus, the portions of the tubular 12 and engagement stem 22 have their surface portions adhered together, in definitive manner, defined in at least one of the regions disposed between said stem portions, in at least part of the length of overlapping between them, and can further include a fixation mean 30 in the form of a weld bead applied against the free-end portion 12a of the tubular stem portion 12 and surrounding the adjacent peripheral region of the engagement stem portion 22 and further, optionally, another fixation mean 30a in the form of a weld bead of addition provided between the free-end portion 22a of the engagement stem 22 and the adjacent region of the base end portion 12b of the tubular stem portion 12.

Figure 5A:
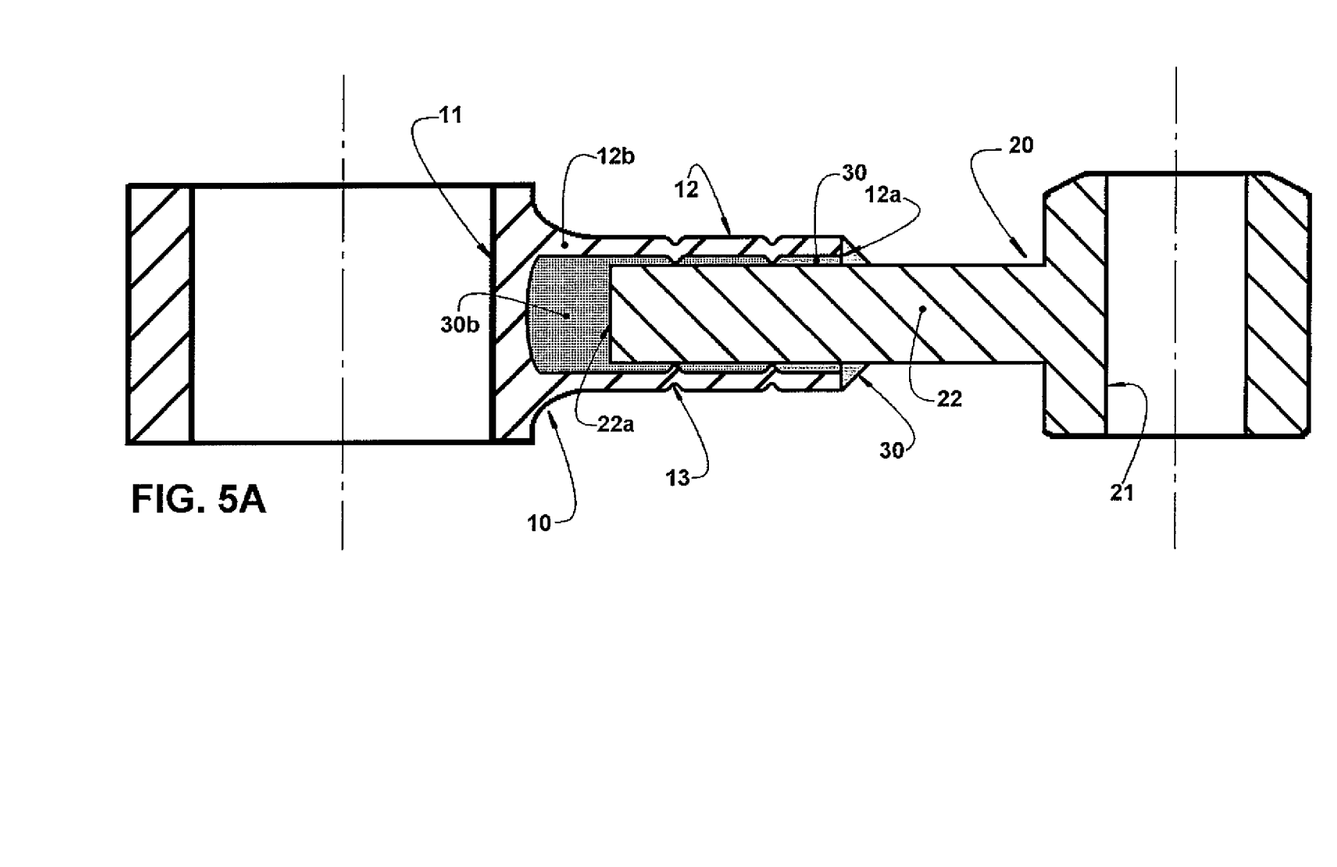
FIG. 5A represents a similar view to that of FIG. 5, but illustrating a constructive variant that uses one of the fixation means in the form of an adhesive load provided in the inner end region of the tubular stem portion.
Figure 6:
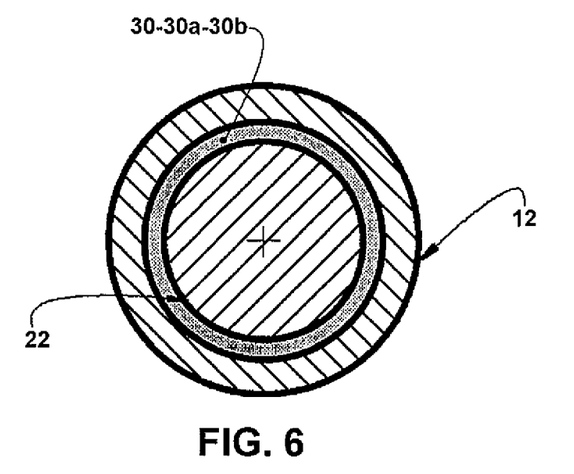
FIG. 6 represents a cross-sectional view of the connecting rod taken along the line VI-VI in FIG. 5.

In another constructive possibility, illustrated in FIG. 5A, the tubular 12 and engagement 22 stem portions have their surface portions adhered together, in definitive manner, by other fixation mean 30b, in the form of an adhesive load provided in the interior of the tubular stem portion 12, non-overlapped to the engagement stem portion 22, and filling the inner end region of the tubular stem portion 12, not occupied by engagement stem portion 22, and at least part of the length of overlapping between them. This fixation mean 30b can be normally used for substituting the fixation mean 30, in the form of a weld bead, and substituting the other fixation mean 30a in the form of welded ring of addition.

The method of mounting the connecting rod, which is the object of the present invention, is carried out by steps hereinafter described and which can undergo some variations, in function of the constructive features of the compressor, particularly its cylinder 2 and further from the second portion of the connecting rod 20.

Independently of the construction of the cylinder 2, the mounting method of the invention comprises a first step defined by the formation, by any suitable constructive means, of a first and a second portion of the connecting rod 10, 20, with one of them having a tubular stem portion 12 and the other portion of the connecting rod being provided with an engagement stem portion 22 having cross-section with outer contour smaller than the inner contour of the cross-section of the tubular stem portion 12.

The first and the second connecting rod portion 10, 20, can be obtained in any suitable material, for example, by means of extrusion or drawing, cold forming a lower carbon content steel or sintering a metallurgical composition of particulate material.

In the constructive form illustrated in the drawings, the first portion of the connecting rod 10 comprises, preferably in a single piece, a larger eye 11, to be mounted on the eccentric pin 5 of the crankshaft 4 of the compressor and the tubular stem portion 12, while the second portion of the connecting rod 20 comprises, the engagement stem portion 22 and one of the elements defined by a smaller eye 21 (FIG. 1) and a spherical joint 21a (FIG. 1A) for coupling to the piston 6. However, it should be understood that the positioning of the portions of tubular stem 12 and engagement stem 22 can be inverted in relation to the eyes of the connecting rod, i.e., the engagement stem portion 22 can be the one incorporated to the larger eye 11 while the tubular stem portion 12 would be incorporated to the smaller eye 21 or to the spherical joint 21a.

In a first variant of the method of the invention, when applied to a compressor with cylinder 2 defined in bearing block 1 itself, as illustrated in FIG. 1, the method of assembly includes the steps of:

(a) providing one of the first and second portions of the connecting rod 10, 20 with a tubular stem portion 12 and provide the other portion of the connecting rod 20, 10 with an engagement stem portion 22 having cross-section with outer contour smaller than the inner contour of the cross-section of the tubular stem portion 12 and further the piston assembly 6 in the second portion of the connecting rod 20;

(b) mounting the assembly formed by the second portion of the connecting rod 20 and the piston 6, in the cylinder 2 of the compressor, preferably from the end face of the cylinder 2 opposite to the front face 2a, mainly when the cylinder 2 has a conical shape due to the greater clearance in this region of the face opposite to the front face 2a, facilitating the insertion process;

(c) mounting the first portion of the connecting rod 10 on the eccentric pin 5 of the crankshaft 4;

(d) engaging, telescopically and loosely, the engagement stem portion 22 in the interior of the tubular stem portion 12, maintaining the eccentric pin 5 in the lower dead point condition, aligning the tubular 12 or engagement 22 stem portions with the geometrical axis of the cylinder 2;

(e) conducting the tubular 12 and engagement 22 stem portions 22 to a predetermined condition of both axial and rotational alignment between them and relative axial and preliminary positioning, defining a connecting rod length greater than that required to provide a desired portion of the compression chamber and a respective portion of minimal dead volume at the upper dead point condition of the eccentric pin 5 and piston 6;

(f) subjecting the tubular stem portion 12 to a shaping operation, to form therein circumferential alignments of radial deformations 13 facing inward and seated, with predetermined mechanical interference, against the engagement stem portion 22, holding the latter to the tubular stem portion 12, in said axial and rotational alignment conditions and relative axial and preliminary positioning therebetween;

(g) rotating the crankshaft 4 of the compressor to make the eccentric pin 5 going to the upper dead point condition, seating the piston 6 against a stop 40 provided near the front-end face 2a of the cylinder 2 and compressing, axial and telescopically, the tubular 12 and the engagement 22 stem portions until the eccentric pin 5 reaching the upper dead point position, providing an adjustment of the relative axial positioning of the tubular 12 and the engagement 22 stem portions, for a condition in which the top face 6a of the piston 6 passes to define, with the confronting face 7a of the valves plate 7, the desired portion of the compression chamber and the respective portion of dead volume in the condition of upper dead point of the eccentric pin 5;

(h) rotating the crankshaft 4 to return the eccentric pin 5 to the lower dead point condition; and (i) fixing, mutually and in definitive manner, by an fixation mean 30, 30a, 30b, defined among welding, adhesion and brazing, surface portions of the tubular 12 and the engagement 22 stem portions.

It should be noted that it can exist variations of this sequence of assembly, depending on the particular characteristics of the compressor mechanism, as discussed below.

The relative positioning between the two portions of the connecting rod 10, 20, described above, being already mounted in the compressor or separate therefrom, as a variation of the method, described below, is achieved by means of a suitable positioning device (not shown), which is operatively associated with both portions of the connecting rod, to hold them in said desired positioning, with the necessary axial and rotational alignments (if necessary) and further with the preliminary relative axial positioning that provides to the connecting rod a securely length greater than the desired final one.

In the embodiment of the method described above, the action of the positioning device over both portions of the connecting rod 10, 20, is made with these latter that are already respectively mounted to the eccentric pin 5 and to the piston 6 and the cylinder 2 of the compressor.

The shaping operation of the tubular stem portion 12 can be accomplished, for example, by a crimping device, not illustrated, which must, in this embodiment of the method, be operatively associated to the positioning device. The shaping operation is performed to form, on the tubular stem portion 12, at least two circumferential alignments of radial deformations 13 facing inward and seated, with predetermined mechanical interference, against the engagement stem portion 22, holding the latter to the tubular stem portion 12, in said axial and rotational alignment conditions and relative axial positioning between them.

The proposal that all said assembly steps should be performed with the eccentric pin 5 and piston 6 positioned at the lower dead point is because, at this position, the major portion of the connecting rod is uncovered of the cylinder 2, facilitating the access of the positioning device and the shaping device (crimping)

Figure 7:
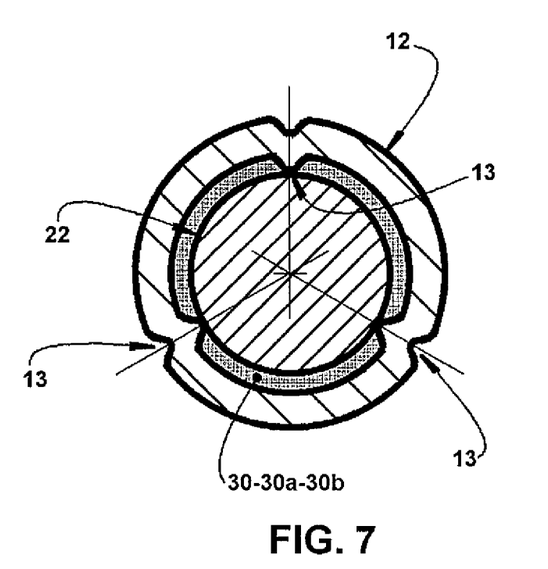
FIG. 7 represents a cross-sectional view of the connecting rod, taken along the line VII-VII in FIG. 5 and sectioning a circumferential alignment of internal radial projections of the tubular stem portion.

As illustrated in FIG. 7, the radial deformations 13 of the tubular stem portion 12 are generally angularly spaced from each other in each circumferential alignment. In the illustrated exemplary embodiment, three radial deformations 13 equally spaced from each other, enabling secure retention between the two portions of the stem 12, 22 are provided in each circumferential alignment.

FIG. 4 illustrates, in a simplified and schematic manner, the provision of a stop 40 seated against the front-end face 2a of the cylinder 2. However, it is preferred that between the stop 40 and the front face 2a of the cylinder 2, the provision of a sealing gasket 9, so that, in this case, the stop 40 is provided with a protrusion 41 of suitable height to compensate for the thickness of the sealing gasket 9 and to ensure the formation of the desired compression chamber portion. The sealing gasket 9 can present any thickness and be a joint of a predetermined group (average), which could be further adjusted (one group above or below) in order to generate an even more accurate chamber (less variability).

The joint 9 can also be eliminated and replaced by an adhesive with specific function of sealing gasket, without detriment to the forming process of the desired compression chamber portion, as described above. The fixation mean 30 used in the method of assembly can be defined in the manner as previously described and illustrated in the definition of the connecting rod in question.

Depending on the used fixation mean 30, it can be provided in the annular space defined between the engagement stem portion 22 and the tubular stem portion 12 and/or between the end edge 12a of the latter and the adjacent outer surface of the engagement stem portion 22, by means of points or a single weld bead, brazing or adhesive complementar or alternative to the fixation mean 30 provided in said annular space.

Depending on the annular clearance specified, it can also be used the fixation mean 30b, already previously described, and that can take the shape of a filling adhesive load of the confined space at the bottom of the tubular stem portion 12, wherein the excess of adhesive is expelled through this annular clearance during the process of adjusting the final connecting rod length, by passing the piston 6 to the condition of upper dead point of the eccentric pin 5.

In a second variant of the method of assembly of the invention, still when applied to a compressor with cylinder 2 defined in bearing block 1 itself, as illustrated in FIG. 1, comprises the basic steps of the method described above, i.e., the steps of providing the tubular 12 and engagement 22 stem portions in the respective, first and second connecting rod portions 10, 20, and assembling the second portion of the connecting rod 20 to the piston 6.

However, in this second form of assembly, telescopic and loose engaging operations of the tubular 12 and engagement 22 stem portions, of alignment and axial positioning between the tubular 12 and engagement 22 stem portions and the shaping operation of the tubular stem portion 12 against the engagement stem portion 22 are made outside of the compressor, that is, prior to the assembly of the respective connecting rod portions 10, 20 in the compressor. In this case, the steps of engaging, telescopically and loosely, the engagement stem portion 22 in the interior of the tubular stem portion 12, and conducting said stem portions 12, 22 to the predetermined condition of alignment and relative axial positioning, are carried out in a positioning device away from the compressor, wherein the shaping step of the tubular portion 12 against the engagement stem portion 22 carried out in a crimp forming device (crimping) also away from the compressor, said steps giving to the connecting rod, as already described above, a safely length larger than the desired final one, i.e., a connecting rod length capable of positioning the top face of the piston 6 at a distance from the confronting face 7a of the valves plate 7 inferior than the predetermined distance to provide a desired compression chamber portion, which forms a respective portion of minimal dead volume at the upper dead point condition of the eccentric pin 5 and piston 6.

After performing the step of shaping, outside of the compressor, by providing the desired degree of mechanical interference between the tubular stem portion 12 and the engagement stem portion 22, the following steps are performed:

separating the first portion of the connecting rod 10 of the second portion of the connecting rod 20;

mounting the second portion of the connecting rod 20 and the piston 6 in the cylinder 2 of the compressor and the first portion of the connecting rod 10 to the eccentric pin 5 of the crankshaft 4;

engaging, telescopically and with predefined interference, the engagement stem portion 22 in the interior of the tubular stem portion 12, by maintaining the eccentric pin 5 of the crankshaft 4 in the lower dead point condition.

Thereafter, in this second variant of the method of assembly, the same steps (g), (h) and (i) of rotation of the crankshaft 4 and mutual and definitive fixation of the tubular 12 and engagement 22 stem portions, previously described in the first variant of the method, are performed.

In a third variant of the method of assembly of the invention, still when applied to a compressor with cylinder 2 defined in the bearing block 1 itself, as illustrated in FIG. 1, the step of providing the tubular 12 and engagement 22 stem portions in the respective, first and second connecting rod portions 10, 20, is the same as that described in the first and second variants of the method.

However, in this third variant of assembly, the piston 6 is not coupled to the second portion of the connecting rod 20 in this phase of the assembly and thus, it occurs later, as described below. Also in this third variant of the method, the steps of telescoping and loose engaging the tubular 12 and the engagement 22 stem portions, of alignment and axial positioning between the tubular 12 and engagement 22 stem portions and the shaping operation of the tubular stem portion 12 against the engagement stem portion 22 are carried out outside of the compressor, that is, prior to the assembly of the respective connecting rod portions 10, 20, in the compressor. In this case, the steps of engaging, telescopically and loosely, the engagement stem portion 22 in the interior of the tubular stem portion 12, and conducting said stem portions 12, 22 to the predetermined condition of alignment and relative axial positioning, are carried out in a positioning device away from the compressor, being the shaping step of the tubular portion 12 against the engagement stem portion 22 carried out in a shaping device (crimping) also away from the compressor, said steps by giving to the connecting rod, as already described above, a safely length larger than the desired one.

After performing the step of shaping, outside of the compressor, by providing the desired degree of mechanical interference between the tubular stem portion 12 and the engagement stem portion 22, the following steps are performed:

mounting the first and second portion of the connecting rod 10, 20, on the eccentric pin 5 and in the cylinder 2 of the compressor, respectively and through the longitudinal slot 2b, with the eccentric pin 5 held in the lower dead point condition; and inserting the piston 6 in the cylinder 2 and fixing it to the second portion of the connecting rod 20. It should be understood that the piston 6 can be inserted in the cylinder 2 prior to the assembly of the first and the second portion of the connecting rod in the compressor.

Thereafter, in this third variant of the method of assembly, the same steps (g), (h) and (i) of rotation of the crankshaft 4 and mutual and definitive fixation of the tubular 12 and engagement 22 stem portions, previously described in the first variant of the method, are performed.

Further, according to the third variant of the method of the invention, the assembly of the second portion of the connecting rod 20, in the interior of the cylinder 2 of the compressor, is carried out by means of its radial displacement through a longitudinal slot 2b, laterally and superiorly provided in the cylinder 2, wherein the second portion of the connecting rod 20 incorporates a smaller eye 21 that it is fixed to the piston 6 by means of a pin 23 inserted through the same longitudinal slot 2b of the cylinder 2.

In a fourth variant of the assembly method of the invention, it is applied to a compressor whose cylinder 2 is formed by a liner 8 fixed to a respective hole 1a of the bearing block 1 of the compressor, as illustrated in FIG. 1A, wherein the step of providing the tubular 12 and engagement 22 stem portions in the respective, first and second connecting rod portions 10, 20, is the same as already described into the first, second and third variants of the method.

In this fourth variant of the assembly, the piston 6 is coupled to the second portion of the connecting rod 20 before or after performing the steps of telescopically and loosely engaging the engagement stem portion 22 in the tubular stem portion 12, of alignment and axial positioning between the tubular 12 and engagement 22 stem portions and of the step of shaping the tubular stem portion 12 against the engagement stem portion 22, which are also carried out outside of the compressor, in a positioning device and a shaping device away from the compressor, said steps giving to the connecting rod, as previously described, a length securely greater than the final one desired.

The coupling of the piston 6 to the second portion of the connecting rod 20, before or after this sequence of operations, depends on the configuration of the used smaller eye 21 or the spherical joint 21a.

After performing the step of shaping, outside of the compressor, by providing the desired degree of mechanical interference between the tubular stem portion 12 and the engagement stem portion 22, the following steps are performed:

mounting the first portion of the connecting rod 10 and the second portion of the connecting rod 20 fixed to the piston 6, on the eccentric pin 5 and into the hole 1a of the bearing block 1, respectively, with the eccentric pin 5 held in the lower dead point condition; and inserting the linen 8 into the hole 1a of the bearing block 1, wearing it on the piston 6.

Hereinafter, in this fourth variant of the method of assembly, the same steps (g), (h) and (i) of rotation of the crankshaft 4 and mutual and definitive fixation of the tubular 12 and engagement 22 stem portions, previously described in the first variant of the method, are performed.

It should be understood that the constructive possibilities and the method of assembly described herein can be individually presented in particular embodiments or also partially or fully combined together.

The invention claimed is:

1. Two-parts telescopic connecting rod, comprising:

a first portion of the connecting rod to be mounted on an eccentric pin of a crankshaft and a second portion of the connecting rod to be articulated in a piston having a top face to be displaced, in alternative movement within a cylinder having an opened front-end face and which is closed by a confronting face of a valves plate, in that one of the first and second portions of the connecting rod comprises a tubular stem portion, while the other of the first and second portions of the connecting rod comprises an engagement stem portion which is telescopically engaged into an interior of the tubular stem portion characterized by the tubular stem portion incorporating at least two circumferential alignments of radial deformations crimped into an outer surface of the tubular stem portion, which radially extend from the inner an inner surface of the tubular stem portion, facing inward and seated, with predetermined mechanical interference against the engagement stem portion, retaining the engagement stem portion to the tubular stem portion, in a predetermined condition of axial and rotational alignment, wherein the tubular and engagement stem portions are adhered together, in definitive manner, by a fixation adhesive, in a relative axial positioning, in a condition in which the top face of the piston maintains a predetermined distance from the confronting face of the valves plate to provide a desired compression chamber portion which defines a respective portion of a dead volume in a condition of an upper dead point of the eccentric pin and the piston;

a welded ring of addition is disposed at a distal free end portion of the engagement stem portion.

2. Connecting rod, according to claim 1, characterized in that an outer contour of the engagement stem portion and the inner surface of the tubular stem portion are circular, defining between the outer contour of the engagement stem portion and the inner surface of the tubular stem portion, an annular space filled with the fixation adhesive in at least a portion of an overlapping longitudinal length of the tubular stem portion relative to the engagement stem portion.

3. Connecting rod, according to claim 2, characterized in that the at least two circumferential alignments of radial deformations of the tubular stem portion are angularly spaced from each other in each circumferential alignment.

4. Connecting rod, according to claim 1, characterized in that the first portion of the connecting rod comprises, in a single piece, a larger eye, to be mounted on the eccentric pin of the crankshaft, and one of the tubular and engaging stem portions, wherein the second portion of the connecting rod comprises the other of said tubular and engagement stem portions and one of elements defined by a smaller eye and a spherical joint for coupling to the piston.

5. Connecting rod, according to claim 1, characterized in that the fixation adhesive includes a cord or weld spots provided between said tubular and engagement stem portions, in at least one of regions of the bottom of the tubular stem portion and at one end of the length of overlap between the regions of the bottom of the tubular stem portion and the length of overlap, adhering, in definitive manner, the tubular stem portion, to a peripheral circumferential region, adjacent to the engagement stem portion.

* * * * *

UNITED STATES PATENT AND TRADEMARK OFFICE
CERTIFICATE OF CORRECTION

PATENT NO. : 10,584,693 B2
APPLICATION NO. : 15/392442
DATED : March 10, 2020
INVENTOR(S) : Joao Victor Lindroth et al.

Page 1 of 1

It is certified that error appears in the above-identified patent and that said Letters Patent is hereby corrected as shown below:

In the Claims

In Claim 1:
Column 14, Line 43, "into" should be deleted and --on-- should be inserted.

In Claim 1:
Column 14, Line 44, "the inner" should be deleted.

Signed and Sealed this
Fifth Day of May, 2020

Andrei Iancu
*Director of the United States Patent and Trademark Office*